US006111499A

United States Patent [19]

Morikami

[11] Patent Number: 6,111,499

[45] Date of Patent: Aug. 29, 2000

[54] WARNING SYSTEM FOR AN OUTBOARD MOTOR

[75] Inventor: Tadaaki Morikami, Hamamatsu, Japan

[73] Assignee: Suzuki Motor Corporation, Shizuoka-ken, Japan

[21] Appl. No.: 09/363,873

[22] Filed: Jul. 29, 1999

[30] Foreign Application Priority Data

Aug. 3, 1998 [JP] Japan .................................. 10-219083

[51] Int. Cl.[7] ........................................................ B60Q 1/00

[52] U.S. Cl. .......................... 340/450.3; 340/451; 340/60; 340/501; 123/196 S

[58] Field of Search .................................... 340/450.3, 60, 340/451, 501; 123/196 S

[56] References Cited

U.S. PATENT DOCUMENTS 4,059,087 11/1977 Tanigami et al. .................... 123/196 S
4,328,480 5/1982 Keitel et al. .............................. 340/60
4,489,311 12/1984 Lang et al. .............................. 340/501
4,504,819 3/1985 Hosoya ..................................... 340/60
4,876,529 10/1989 Kubota et al. ....................... 340/450.3
5,107,248 4/1992 Koiwa et al. ........................... 340/451

*Primary Examiner*—Jeffery A. Hofsass
*Assistant Examiner*—Phung Nguyen
*Attorney, Agent, or Firm*—Darby & Darby

[57] ABSTRACT

A warning system for an outboard motor, includes: an oil-pressure switch for outputting the low-pressure state signal when the oil pressure of the lubricating oil lowers than a fixed reference pressure; a control device for controlling the operation of the warning device; a determining device which judges whether the low-pressure state signal continues to be output longer than the predetermined delay time and determines that the oil pressure is abnormal if the judgment is affirmative; and a control device for actuating the warning device so as to perform a warning operation when the determining device has determined that the oil pressure is abnormal.

2 Claims, 8 Drawing Sheets

WARNING SYSTEM FOR AN OUTBOARD MOTOR

BACKGROUND OF THE INVENTION (1) Field of the Invention

The present invention relates to a warning system for an outboard motor, and more detailedly relates to a warning system in an outboard motor for warning of the occurrence of an abnormal oil pressure.

(2) Description of the Prior Art

Conventionally, in an outboard motor having a four-cycle engine, if an abnormal reduction in oil pressure occurs, an oil-pressure switch detects this anomaly so as to perform engine speed control and/or oil pressure warning control. For example, when oil-pressure reduction occurs at an engine speed equal to or above a certain fixed rate, the engine speed is controlled together with buzzing sound warning, LED lighting etc. On the other hand, when the engine speed is lower than the fixed rate, only the buzzing sound warning, LED lighting etc. are performed.

In the above conventional outboard motor, however, only a single oil-pressure switch is usually used, to merely judge whether the oil pressure exceeds a fixed reference oil pressure. Therefore, it has been impossible to perform detection with consideration of change in oil temperature, posing a problem of an insufficiency of the warning function.

For this reason, two oil-pressure switches having different reference oil-pressure thresholds have been used or an oil-pressure sensor capable of continuously detecting the oil-pressure value has been used. In these cases, however, the oil-pressure switches, oil-pressure sensor and the like are costly, and the controller for processing the thus detected value and controlling the operation based thereon also are expensive, resulting in increase in cost of the whole system.

SUMMARY OF THE INVENTION

The present invention has been devised in view of the above problems of the conventional art and it is therefore an object of the present invention to provide a warning system for an outboard motor which is of a simple configuration and can perform a correct warning operation.

In order to achieve the above object, the present invention is configured as follows:

In accordance with the first aspect of the present invention, a warning system for an outboard motor includes:

- a warning means which is actuated to provide a warning when an anomaly of the pressure of the lubricating oil supplied to the engine of the outboard motor occurs;
- an oil-pressure switch for outputting the low-pressure state signal when the oil pressure of the lubricating oil lowers than a fixed reference pressure;
- a control means for controlling the operation of the warning means;
- a determining means which judges whether the low-pressure state signal continues to be output longer than the predetermined delay time and determines that the oil pressure is abnormal if the judgment is affirmative; and
- a control means for actuating the warning means so as to perform a warning operation when the determining means has determined that the oil pressure is abnormal.

In accordance with the second aspect of the present invention, a warning system for an outboard motor includes:

- a warning means which is actuated to provide a warning when an anomaly of the pressure of the lubricating oil supplied to the engine of the outboard motor occurs;

- an oil-pressure switch for outputting the low-pressure state signal when the oil pressure of the lubricating oil lowers than a fixed reference pressure;
- a first determining means which judges whether the low-pressure state signal is output after a lapse of a predetermined waiting time from the engine start and determines that the oil pressure is abnormal if the judgment is affirmative;
- a second determining means which judges whether the low-pressure state signal continues to be output longer than the predetermined delay time and determines that the oil pressure is abnormal if the judgment is affirmative; and
- a control means for actuating the warning means so as to provide a warning when the determining means has determined that the oil pressure is abnormal, wherein the waiting time is set shorter than the delay time.

In accordance with the third aspect of the present invention, the warning system for an outboard motor having the above first feature further includes:

- an engine speed detecting means for detecting the revolution rate of the engine when the low-pressure state signal is output; and
- a time-varying means for changing the duration of the delay time depending upon the engine speed detected by the engine speed detecting means.

In accordance with the fourth aspect of the present invention, the warning system for an outboard motor having the above second feature further includes:

- an engine speed detecting means for detecting the revolution rate of the engine when the low-pressure state signal is output; and
- a time-varying means for changing the duration of the delay time depending upon the engine speed detected by the engine speed detecting means.

According to the first feature of the invention, when the oil pressure of lubricating oil becomes lower than a fixed reference pressure, the oil-pressure switch outputs the predetermined low-pressure state signal, and only when the low-pressure state signal continues to be output longer than the predetermined delay time, the state is determined as an anomaly so as to provide a warning. Therefore, it is possible to correctly distinguish between the pressure lowering due to a mere temperature variation and true abnormal pressure lowering due to a lack of lubricating oil or due to malfunction of oil pressure system, thus providing reliable warnings. Further, the system of the invention can be configured of a single oil-pressure switch and conventionally used parts and mechanisms without the necessity of using any expensive oil-pressure sensors or multiple number of oil-pressure switches, thus leading to low cost.

According to the second feature of the invention, in addition to the judging operation of the above first feature, upon the engine start, the system detects whether the low-pressure state signal is output after a lapse of the waiting time, which is set shorter than the delay time, and if it is detected, the state is determined as an anomaly to thereby provide a warning. Therefore, even if the bearings in the engine lack oil film and thereby an anomaly occurs at the engine start, it is possible to prevent the engine from being seized since an anomaly of oil pressure is detected and determined in a short time after the engine start.

According to the third and fourth features of the invention, the delay time is varied in accordance with the engine speed. Therefore, when the engine is liable to be seized due to a lack of lubricating oil such as during high speed running, the delay time is set short so as to make a judgement of an anomaly in a short period of time, thus making it possible to prevent the engine from being seized. On the other hand, when the engine is not liable to be seized such as during low speed running, a relatively long delay time is set up so as to detect anomalies in conditions with stabilized oil temperatures, which leads to a more reliable detection of an oil-pressure anomaly.

DESCRIPTION OF THE PREFERRED EMBODIMENTS

The embodiment of the present invention will hereinafter be described in detail with reference to the accompanying drawings.

Figure 1:
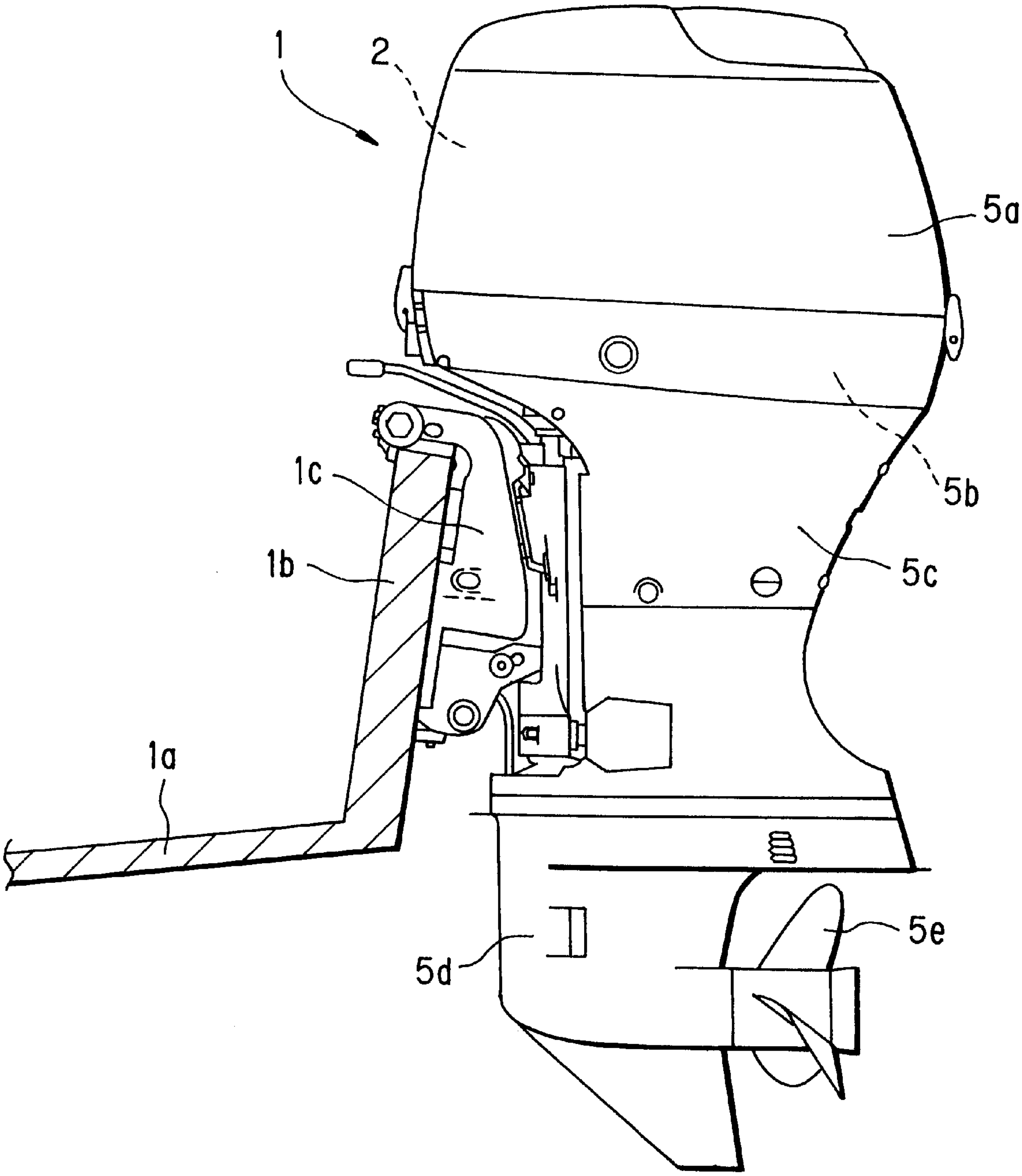
FIG. 1 is an external side view showing an outboard motor in accordance with the embodiment of the present invention.
Figure 2:
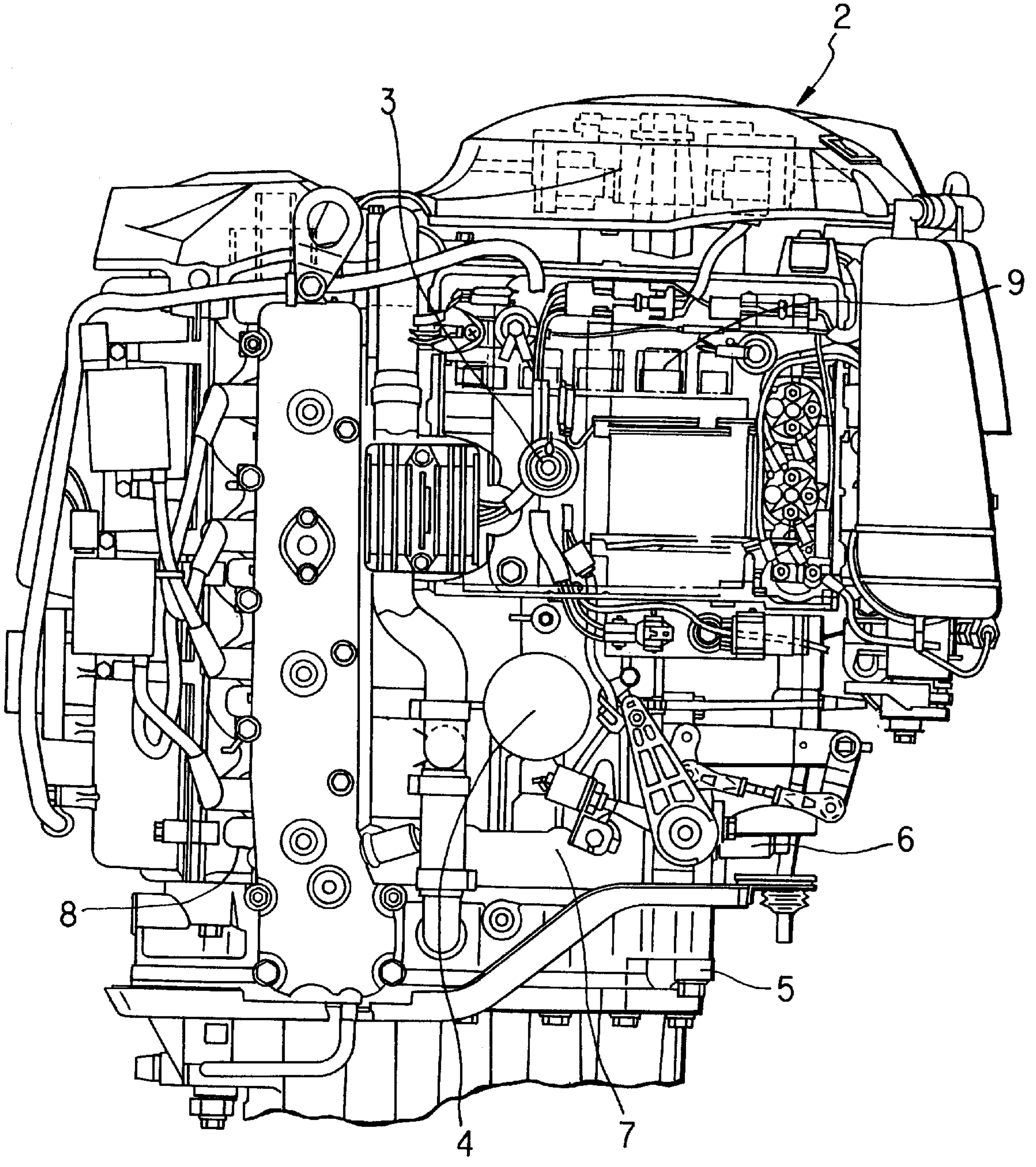
FIG. 2 is a rear-side view showing the inner structure of that shown in FIG. 1.
Figure 3:
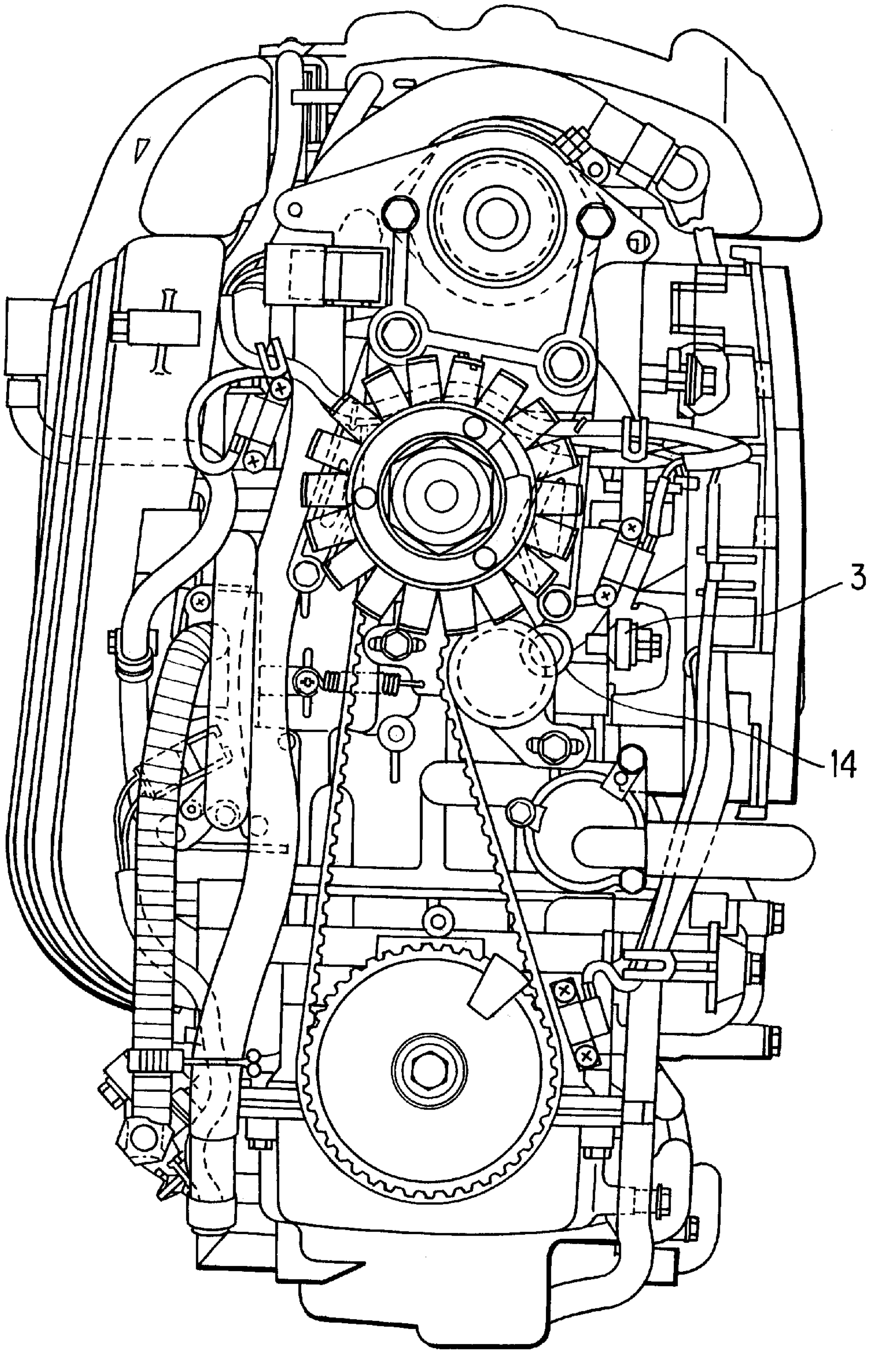
FIG. 3 is a plan view showing the inner structure of that shown in FIG. 2.
Figure 4:
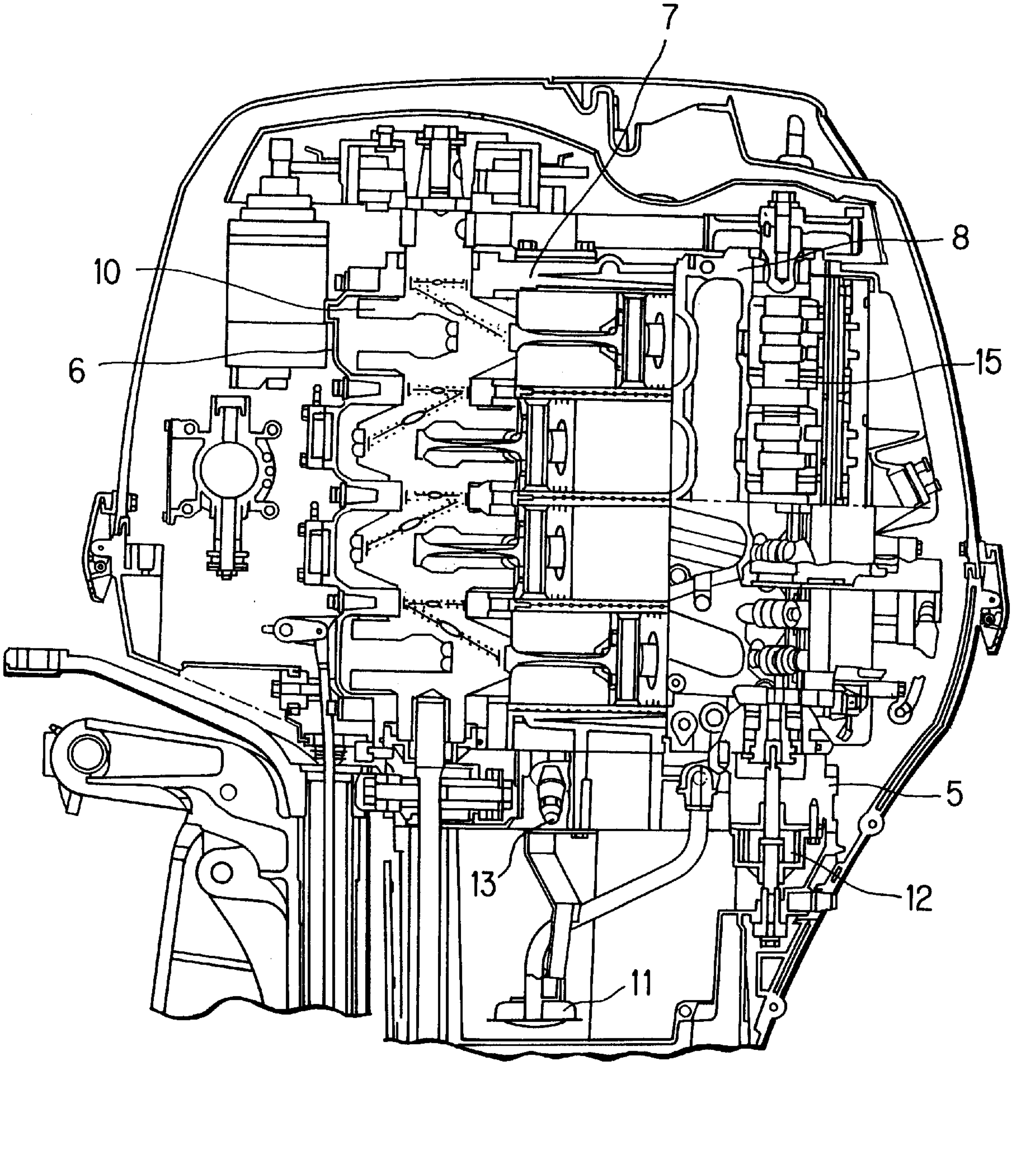
FIG. 4 is a side view showing the inner structure of that shown in FIG. 1.
Figure 5:
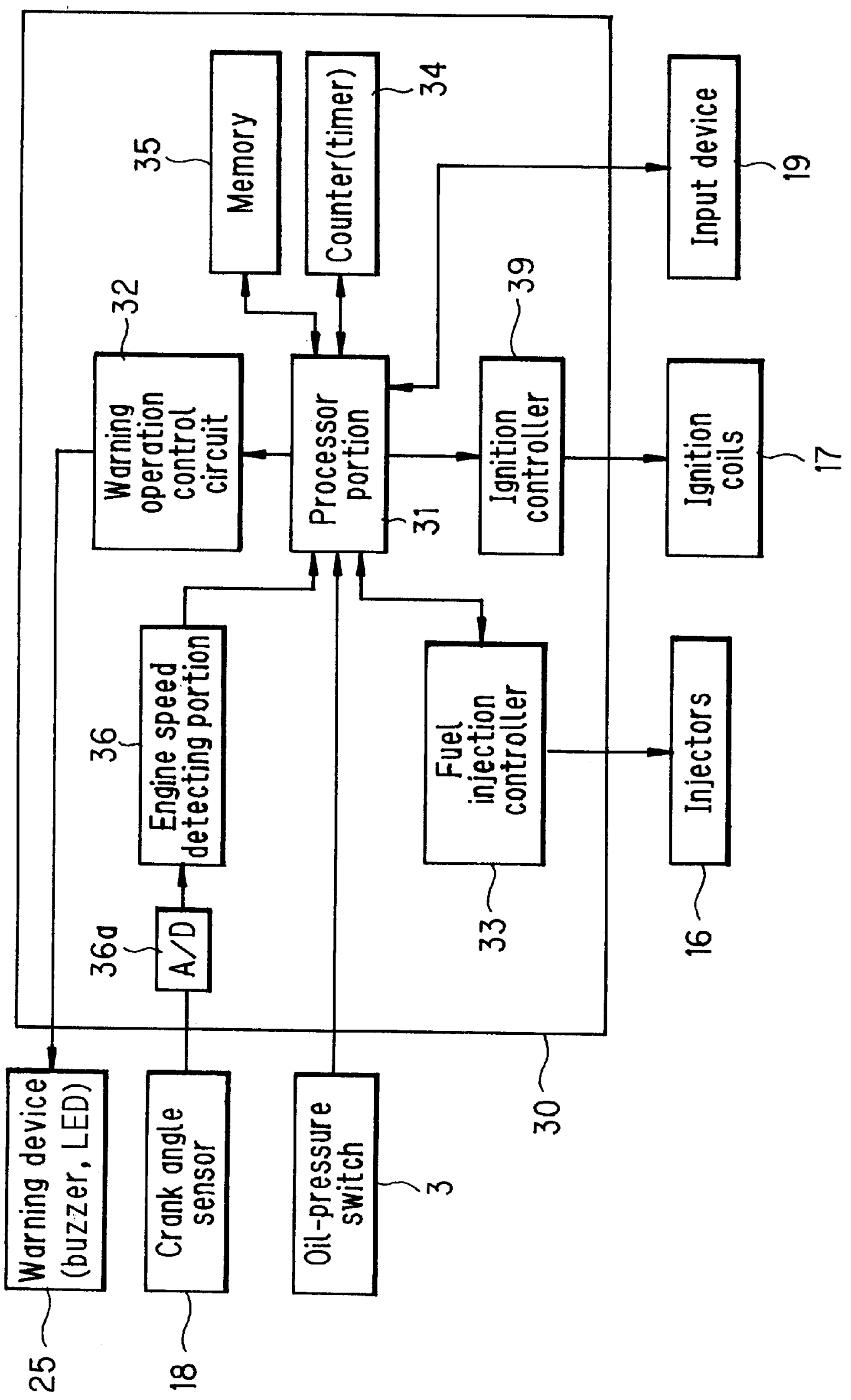
FIG. 5 is a block diagram showing a configuration of a control system circuit of an outboard motor of the embodiment.
Figure 6:
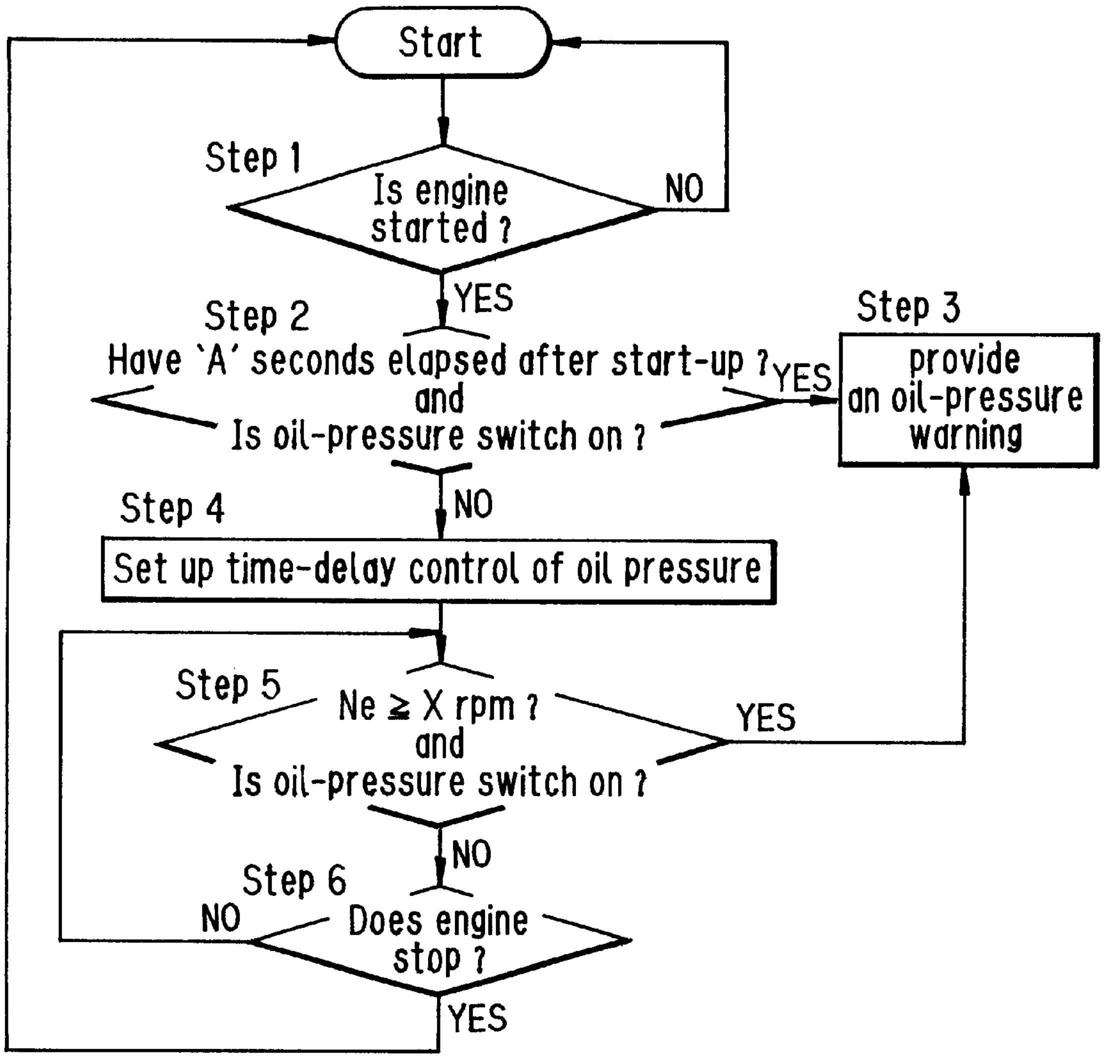
FIG. 6 is a flowchart for illustrating the oil-pressure warning control operation effected by the configuration shown in FIG. 5.
Figure 7:
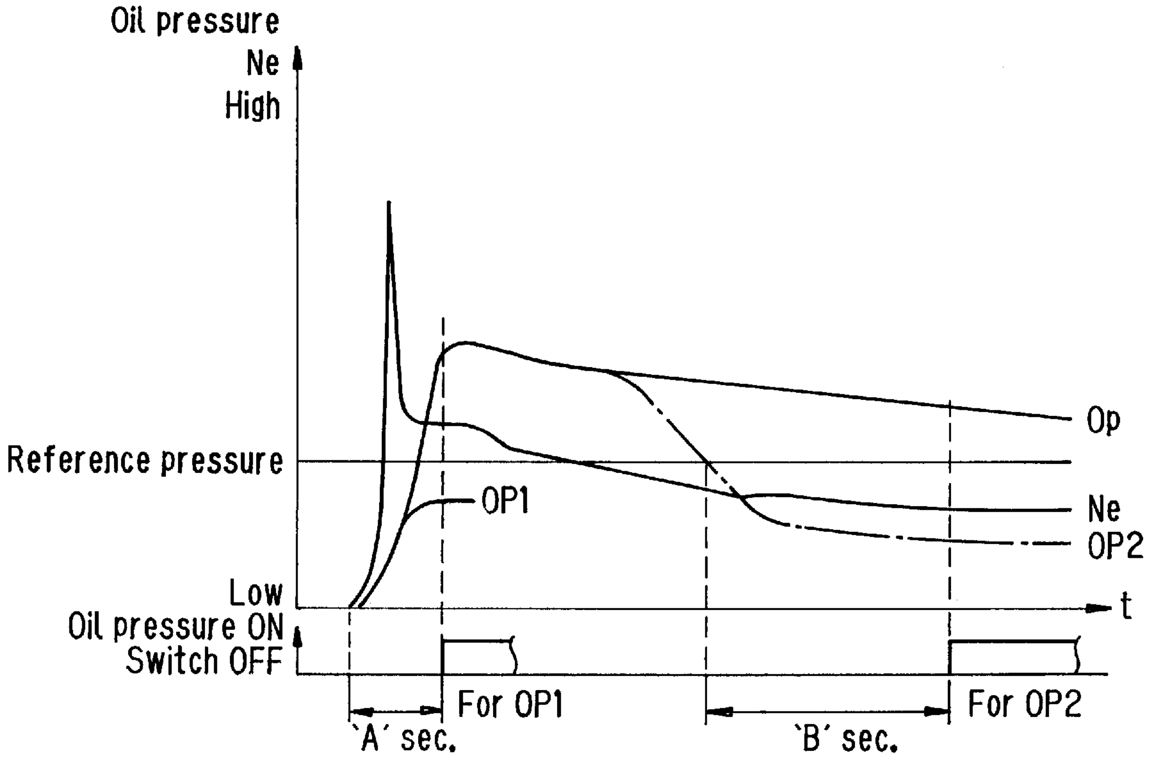
FIG. 7 is a timing chart for illustrating the oil-pressure warning control operation effected at start-up by the configuration shown in FIG. 5.
Figure 8:
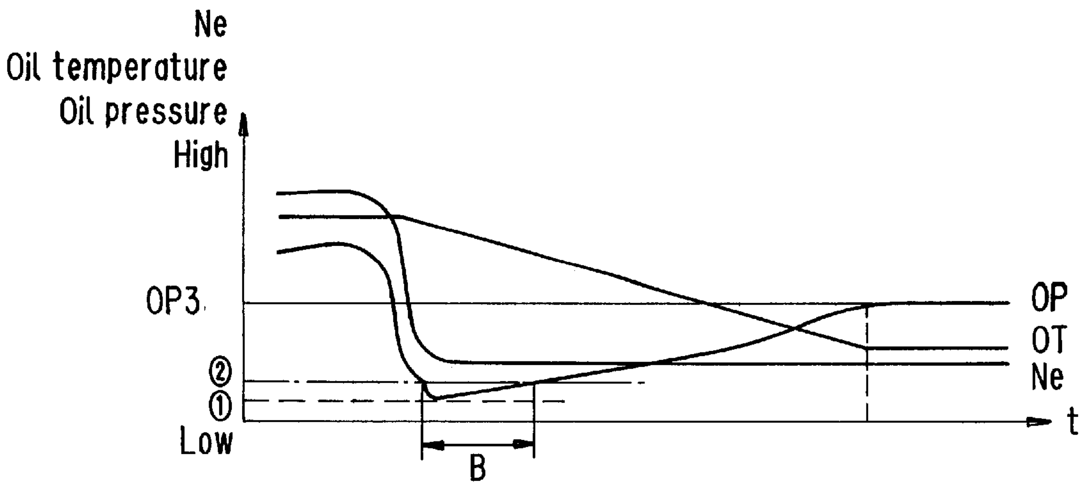
FIG. 8 is a timing chart for illustrating the oil-pressure warning control operation effected during high-temperature by the configuration shown in FIG. 5.
Figure 9:
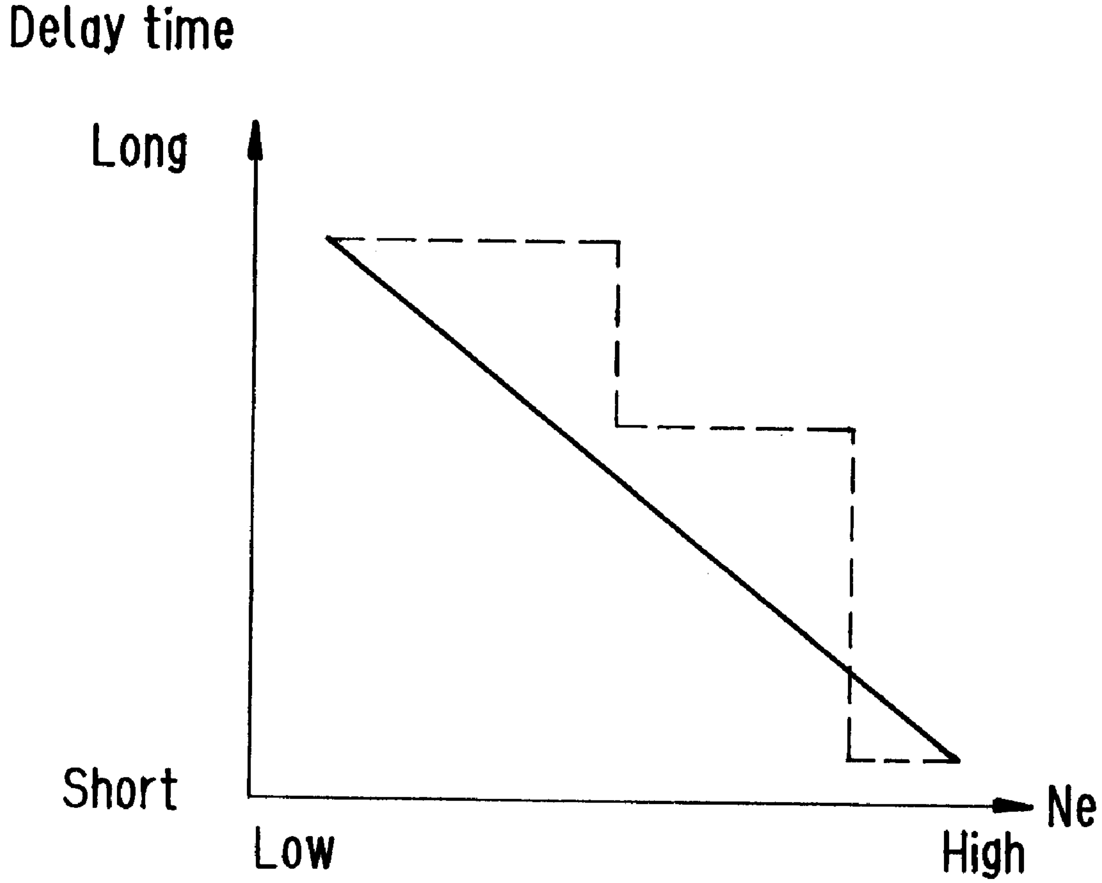
FIG. 9 is a chart showing the relationship between the engine speed and corresponding delay time.

FIG. 1 is an external side view showing an outboard motor in accordance with the embodiment of the present invention; FIG. 2 is a rear-side view showing the inner structure of that shown in FIG. 1; FIG. 3 is a plan view showing the inner structure of that shown in FIG. 2; FIG. 4 is a side view showing the inner structure of that shown in FIG. 1; FIG. 5 is a block diagram showing a configuration of a control system circuit of an outboard motor of this embodiment; FIG. 6 is a flowchart for illustrating the oil-pressure warning control operation effected by the configuration shown in FIG. 5; FIG. 7 is a timing chart for illustrating the oil-pressure warning control operation effected at start-up by the configuration shown in FIG. 5; FIG. 8 is a timing chart for illustrating the oil-pressure warning control operation effected during high-temperature by the configuration shown in FIG. 5; and FIG. 9 is a chart showing the relationship between the engine speed and corresponding delay time.

As shown in FIG. 1, an outboard motor 1 used in this embodiment is mounted to a transom 1*b* of a hull 1*a* by means of a bracket 1*c*. This outboard motor 1 has a drive shaft housing 5*c* which extends vertically in the rear of bracket 1*c* and is of a hollow body having an overall horizontal section of an approximate spindle-shape. Formed over drive shaft housing 5*c* is an engine holder 5*b*, on which an engine 2 lidded with an engine cover 5*a* is mounted. A gear casing 5*d* is linked under drive shaft housing 5*c*. This gear casing 5*d* rotatably supports a propeller shaft having a propeller 5*e* directed horizontally to the rear.

As shown in FIG. 2, this engine 2 is of a four cylinder (or of a multiple cylinder type other than a four cylinder type), four-stroke engine having cylinder heads 8, a cylinder block 7 and a crankcase 6. In this engine, fuel is injected into cylinder heads 8 from injectors 16(see FIG. 4) from an unillustrated fuel tank. A crankshaft 10 is rotatably supported inside crankcase 6 in the approximately vertical direction. A flywheel 17 for an electric generator is fixed on crankshaft 10 and has a crank angle sensor 18 (see FIG. 5) for detecting rotational angle of the crankshaft.

The oil pressure circuit of this outboard motor 1 is configured as follows.

Oil filling the oil pan provided under crankcase 6 is suctioned through an oil strainer 11 by means of an oil pump 12 and conveyed up to an oil filter 4. Because gasket sealing may break down if the oil pressure becomes too high, a relief valve 13 is arranged before oil filter 4 so as to control the upper limit of the oil pressure.

The oil having passed through oil filter 4 passes by a main journal 14 and is distributed to crankshaft 10, cylinder heads 8 and a camshaft 15, and then falls and returns to the oil pan due to gravity.

An oil-pressure switch 3 is arranged in main journal 14 to monitor the oil pressure downstream of oil filter 4.

Also the outboard motor has a control system circuit shown in FIG. 5.

In the figure, 30 designates the control unit. As shown in FIGS. 4 and 5, this control unit 30 is connected on its input side with an input device 19 through which various set values are input, a crank angle sensor 18, oil-pressure switch 3 and the like. The output side of control unit 30 is connected to injectors 16 provided for individual cylinder heads 8 and a warning device 25. In this arrangement, injectors 16, warning device 25 and the like are controlled based on the signals output from oil-pressure switch 30 and crank angle sensor 18.

In this case, oil-pressure switch 3 outputs the ON signal (low-pressure state signal) when the oil pressure downstream of filter 4 is equal to or below a certain reference pressure while the switch outputs the OFF signal when the oil pressure exceeds the reference pressure. Warning device 25 is configured of a buzzer for producing a warning sound, an LED indicator indicating a warning, and the like.

Control unit 30 has the configuration shown in FIG. 5. Specifically, control unit 30 has a processor portion 31 for performing various computing, control and judgement etc. (corresponding to the delay means, first and second determining means, time-varying means). The input side of the processor portion includes: an engine speed detecting portion (engine speed detecting means) 36 which receives the detected signal from crank angle sensor 18, digitally converted through an A/D converter 36*a* and detects the engine speed (the number of revolutions of the crankshaft); an oil-pressure determining means 38 which receives the signal from oil-pressure switch 3 and judges whether any abnormal oil pressure occurs; a counter (timer) 34 for counting or time-measuring; and a memory 35 for storing a variety of data including table data of engine speed and delay time.

Connected to the output side of processor portion 31 are: a warning operation controller 32 for controlling warning device 25; a fuel injection controller 33 for controlling the operation of injectors 16; an ignition controller 39 for controlling ignition control in each ignition coil 17; and the like. Based on the data signals from these portions, warning operation controller 32, fuel injection controller 33, ignition controller 39 and other portions are controlled. Here, processor portion 31 and warning operation control circuit 32 form the controlling means.

Next, the warning operation control of the thus configured embodiment will be described.

When the power source is activated and the engine of the outboard motor is started, processor portion 31 judges whether 'A' seconds have elapsed from the engine start, based on the time-measuring operation of counter 34 and also determines whether the signal from oil-pressure switch 3 is in the ON state, that is, whether the oil-pressure is lower than the reference pressure (Steps 1 and 2). As is shown in FIG. 7, the value of 'A' seconds is set longer than the time it takes for the engine speed Ne to Decrease from its start-up peak speed, i.e., 'A' seconds is greater than the engine pick-up time. At this moment, if the oil-pressure switch outputs the ON signal, i.e., the low-pressure state signal when the engine speed reaches a certain degree after a lapse of 'A' seconds as shown by Ne (the engine speed curve) in FIG. 7, the processor portion 31 will determine the current state as an abnormal state with an insufficient oil pressure which is lower than the reference pressure, and will control warning operation control circuit 32 so as to actuate warning device 25 of a buzzer and/or LED etc., to warn the operator of the oil-pressure anomaly (Step 3). In the judgment at Step 2, when the OFF signal is output after a lapse of 'A' seconds from the engine start, this indicates that the oil pressure OP increases, exceeding the reference pressure, with the increase of the engine speed as shown in FIG. 7. Therefore, it is judged that normal oil-pressure has been obtained so that operation goes to Step 4.

At Step 4, the processor reads out and sets up a reference revolution rate (X rpm) and the corresponding delay time from the table data stored in memory 35, based on the engine speed after a lapse of 'A' seconds from the engine start. Subsequently, at Step 5, the output signal from oil-pressure switch 3 and the engine speed detected by engine speed detecting portion 36 are monitored until the stoppage of the engine is detected at Step 6. When the ON signal is detected from the oil-pressure switch while the engine speed Ne is equal to or above X rpm, it is judged whether the ON signal continues to be output until a delay time 'B' elapses. If the judgment is affirmative, it is determined as that the oil pressure has lowered due to some abnormal operation, and operation goes to Step 3 where the above-described oil-pressure warning operation is effected.

In this way, in the present embodiment, if the oil pressure lowers below the reference pressure during engine running, the lowering will not be determined as abnormal immediately, unlike the conventional configuration, but it will be determined as abnormal when the oil pressure does not recover after a lapse of the fixed delay time. Therefore, it is possible to distinguish true oil-pressure anomalies due to malfunction of the oil pressure system or due to reduction of the oil amount from temporal reduction in oil pressure due to a variation in oil temperature or other reasons. Resultantly, no unwanted warning will occur, which means a remarkable improvement in the reliability of the warning.

The viscosity of oil lowers as the temperature becomes higher hence the oil pressure lowers. On the contrary, the viscosity is high when the temperature is low, hence the oil pressure increases. With an engine such as an outboard motor which has a wide use range of engine speed, e.g., from 700 rpm to 7000 rpm, the oil temperature will also vary in a wide range from 50° C. to 130° C. Therefore, as shown in FIG. 7, if the engine speed is sharply lowered to about 700 rpm from the state where the engine has been driven at a high engine speed Ne of e.g., 7000 rpm with the oil pressure OP and oil temperature OT being high enough, the oil pressure OP lowers to a very low level compared to a pressure OP3 set by the relief valve.

However, this variation is not a true anomaly due to malfunction of the oil pressure system or due to a lack of oil. That is, if the engine speed lowers after a while and hence the oil temperature OT also gradually lowers, the oil pressure will recover to the pressure OP3 set by the relief valve. Therefore, if this case was judged as an anomaly, unwanted warning would be generated, which means a degradation of reliability of the warning.

In order to avoid the above problem, in the conventional oil control using an oil-pressure switch, the reference level of oil pressure is set at a low value designated at (1) in FIG. 7, in consideration of the oil pressure during high temperature low speed running. However, the control with this setting cannot provide the engine with enough margin for oil-pressure reduction during high speed running.

In the present embodiment, a relatively high oil pressure designated at (2) is set as the reference value whereby the above conventional problems can all be eliminated.

Further, in this embodiment, if a long delay time B is set for high speed running, there is a risk of the detection of an anomaly being delayed. Therefore, the delay time is set in accordance with the engine speed. When the delay time is set long for high speed running, there is a risk that the engine might be seized during the delay time if a true oil-pressure anomaly occurs. On the other hand, when the delay time is set long for low speed running, there is no chance of the engine being seized even if a true oil-pressure anomaly occurs. Therefore, if the delay time is long, it is possible to determine whether a true oil-pressure anomaly is occurring in a more correct manner. For these reasons, in this embodiment, the delay time is set short for high speed running and set long for low speed running, as shown in FIG. 9.

Further, in the present embodiment, waiting time 'A' immediately after the engine start, is set shorter than delay time 'B' for the following engine running state. This setting is to take into account that the engine is most liable to be seized when starting because of an insufficient supply of lubricating oil. Actually, outboard motors and the like are often used after a long storage term, therefore there is a high possibility of various bearings lacking oil film. In such a case, the engine may be readily seized by only an engine start. Consequently, if the waiting time is set as long as the delay time for low speed running, the engine has a high risk of seizure. This is why the oil pressure is checked within time 'A' shorter than delay time 'B' to prevent the engine from being seized in this embodiment.

As has been described above, in accordance with the first feature of the present invention, when the oil pressure of lubricating oil becomes lower than a fixed reference pressure, the oil-pressure switch outputs the predetermined low-pressure state signal, and only when the low-pressure state signal continues to be output longer than the predetermined delay time, the state is determined as an anomaly so as to provide a warning. Therefore, it is possible to correctly distinguish between the pressure lowering due to a mere temperature variation and true abnormal pressure lowering due to a lack of lubricating oil or due to malfunction of oil pressure system, thus providing reliable warnings.

Further, the system of the invention can be configured of a single oil-pressure switch and conventionally used parts and mechanisms without the necessity of using any expensive oil-pressure sensors or multiple number of oil-pressure switches, thus leading to low cost.

In accordance with the second feature of the invention, upon the engine start, the system detects whether the low-pressure state signal is output after a lapse of the waiting time, which is set shorter than the delay time, and if it is detected, the state is determined as an anomaly to thereby provide a warning. Therefore, even if the bearings in the engine lack oil film and thereby an anomaly occurs at the engine start, it is possible to prevent the engine from being seized since an anomaly of oil pressure is detected and determined in a short time after the engine start.

In accordance with the third and fourth features, the delay time is varied in accordance with the engine speed. Therefore, when the engine is liable to be seized due to a lack of lubricating oil such as during high speed running, the delay time is set short so as to make a judgement of an anomaly in a short period of time, thus making it possible to prevent the engine from being seized. On the other hand, when the engine is not liable to be seized such as during low speed running, a relatively long delay time is set up so as to detect anomalies in conditions with stabilized oil temperatures, which leads to a more reliable detection of an oil-pressure anomaly.

What is claimed is:

1. A warning system for an outboard motor, comprising:

a warning means which is actuated to provide a warning when an anomaly of the pressure of the lubricating oil supplied to the engine of the outboard motor occurs;

an oil-pressure switch for outputting the low-pressure state signal when the oil pressure of the lubricating oil is lower than a fixed reference pressure;

a first determining means which judges whether the low-pressure state signal is output after as lapse of a predetermined waiting time from the engine start and determines that the oil pressure is abnormal if the judgment is affirmative;

a second determining means which judges whether the low-pressure state signal continues to be output longer than a variable delay time and determines that the oil pressure is abnormal if the judgement is affirmative; and a control means for actuating the warning means so as to provide a warning when the determining means has determined that the oil pressure is abnormal, wherein the waiting time is set shorter than the delay time and wherein the waiting time is set longer than the engine pick-up time.

2. The warning system for an outboard motor according to claim 1, further comprising:

an engine speed detecting means for detecting the revolution rate of the engine when the low-pressure state signal is output; and a time-varying means for changing the duration of the delay time depending upon the engine speed detected by the engine speed detecting means.

* * * * *